United States Patent [19]
Ament et al.

[11] Patent Number: 5,492,679
[45] Date of Patent: Feb. 20, 1996

[54] ZEOLITE/CATALYST WALL-FLOW MONOLITH ADSORBER

[75] Inventors: Frank Ament, Troy; David A. Singer, Farmington, both of Mich.

[73] Assignee: General Motors Corporation, Detroit, Mich.

[21] Appl. No.: 28,069

[22] Filed: Mar. 8, 1993

[51] Int. Cl.$^6$ .................................................. B01D 53/54
[52] U.S. Cl. .......................... 422/180; 422/169; 422/171; 422/177; 55/523; 55/DIG. 30; 60/297; 502/66
[58] Field of Search .................................... 422/177, 180, 422/169, 170, 171; 55/DIG. 30, 523; 60/297, 300, 311; 502/66, 74

[56] References Cited

U.S. PATENT DOCUMENTS

| | | | |
|---|---|---|---|
| 3,954,672 | 5/1976 | Somers et al. | 252/455 R |
| 4,276,071 | 6/1981 | Outland | 55/523 |
| 4,390,355 | 6/1983 | Hammond, Jr. et al. | 55/523 |
| 4,509,966 | 4/1985 | Dimick et al. | 422/180 |
| 4,857,089 | 8/1989 | Kitogawa et al. | 422/180 |
| 4,985,210 | 1/1991 | Minami | 422/171 |
| 5,089,237 | 2/1992 | Schuster et al. | 422/180 |
| 5,164,350 | 11/1992 | Abe et al. | 502/66 |

OTHER PUBLICATIONS

SAE Technical Paper Series #920847 entitled "Cold–Start Hydrocarbon Collection for Advanced Exhaust Emission Control" Martin J. Heimrich, Lawrence R. Smith, Jack Kitowski.

Primary Examiner—Robert J. Warden
Assistant Examiner—Hien Tran
Attorney, Agent, or Firm—Karl F. Barr, Jr.

[57] ABSTRACT

An exhaust system for an internal combustion engine having a primary catalytic converter located downstream of the engine and a hydrocarbon adsorber located downstream of the primary converter. The adsorber comprises a ceramic wall-flow substrate having a zeolite coating, having the ability to selectively adsorb hydrocarbon molecules from exhaust gas, applied to the interior surfaces of the inlet passages of the substrate and a catalytic coating applied to the adjacent surfaces of the walls of the outlet passages of the substrate. The catalyst preferably has a light-off temperature below the desorption temperature of the zeolite. In operation, hydrocarbon is adsorbed by the zeolite following a cold engine start and is held until the zeolite reaches its desorption temperature at which time the hydrocarbon is released and passes through the porous walled substrate for conversion by the catalyst.

6 Claims, 1 Drawing Sheet

5,492,679

ZEOLITE/CATALYST WALL-FLOW MONOLITH ADSORBER

TECHNICAL FIELD

This invention relates to an exhaust treatment apparatus for the reduction of hydrocarbon emissions for an internal combustion engine following cold-start and, more particularly, to a ceramic wall-flow monolith substrate having a zeolite molecular sieve and a catalyst applied to adjacent walls.

BACKGROUND

Considerable interest has been focused on reducing the level of hydrocarbon emissions from internal combustion engines. Typically, automotive emissions applications employ an exhaust mounted, catalytic treatment device for reducing regulated exhaust constituents such as Hydrocarbons (HC), Carbon Monoxide (CO), and Oxides of Nitrogen ($NO_x$) in the engine exhaust prior to its release to the atmosphere. Such catalytic treatment devices, or catalytic converters, rely on the latent heat of the exhaust gas to become catalytically active following a cold engine start. Initiation of catalyst activity occurs at the light-off temperature which is typically in the area of 400 degrees C. for commonly used catalysts. As such, a vehicle may require 75–100 seconds or more before the engine supplies sufficient heat, through the exhaust gas, for the catalyst to light-off. Cold start emissions are typically recognized as a significant contributor to hydrocarbon exhaust emissions from catalyst-equipped engines with seventy to eighty percent of HC emissions emitted during the first one minute of operation.

SUMMARY OF THE INVENTION

The present invention proposes the use of a porous wall, ceramic monolithic substrate of the type described in U.S. Pat. No. 4,276,071 entitled "Ceramic Filters for Diesel Exhaust Particulates", issued Jun. 30, 1981 to Robert J. Outland and assigned to the assignee of the present invention. To the substrate is applied a Zeolite coating having the ability to selectively adsorb HC molecules. The HC molecules are stored in the Zeolite following an engine cold start and until the Zeolite reaches a temperature at which it begins to desorb the stored HC's.

Also applied to the walls of the ceramic substrate, preferably on the adjacent, or downstream wall to the Zeolite coating, is a catalyst material formulated to light-off at a temperature which closely corresponds to the desorption temperature of the Zeolite. The HC's released from the Zeolite pass through the porous walls of the substrate where they are reacted by the catalyst prior to release to the atmosphere.

In the preferred embodiment disclosed, the Hydrocarbon adsorber is located downstream of the primary catalytic converter with engine exhaust diverted to the adsorber following cold-start of the engine. During normal, high-temperature operation, exhaust flow is diverted around the adsorber to preserve the lower temperature catalyst from the deleterious effect of high-temperature operation and to increase engine efficiency by reducing system backpressure.

These and other features and advantages of the invention will become more apparent by reference to the following description and to the drawings.

DESCRIPTION OF THE PREFERRED EMBODIMENT

Figure 1:
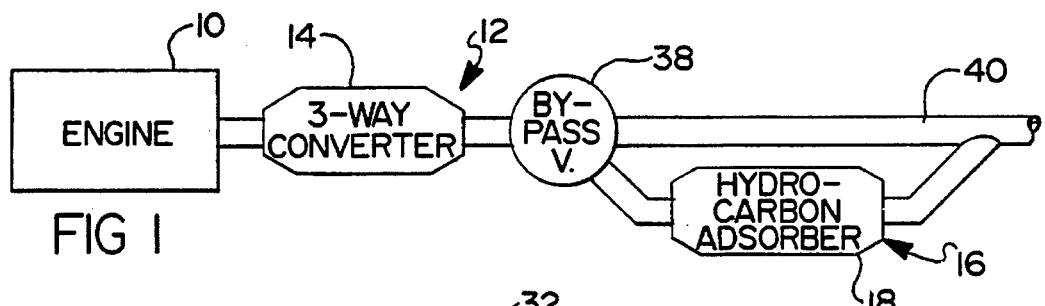
FIG. 1 is a schematic view of an internal combustion engine exhaust system embodying the present invention.

FIG. 1 schematically illustrates an application of the zeolite/catalyst wall-flow monolith adsorber of the present invention to the exhaust system of an internal combustion engine. The engine 10 is connected to an exhaust system, designated generally as 12. The exhaust system 12 conducts exhaust gas from engine 10 to a primary catalytic converter 14. The converter is typically a 3-way catalytic converter designed for long-term, high-temperature durability. A penalty for such long-term durability is a significantly high light-off temperature required prior to efficient conversion of the exhaust gas.

In order to reduce the quantity of unreacted Hydrocarbons released to the atmosphere during converter warm-up a hydrocarbon adsorber 16 is situated downstream of the primary converter 14. The adsorber 16 includes a housing 18 which may be of any form of construction and configuration suitable for the purpose. Within the housing 18 there is disposed a ceramic wall-flow monolithic substrate 20, illustrated in FIGS. 2 and 3. The substrate 20 has a surrounding outer wall 22 internally interconnected by a large number of interlaced, thin porous internal walls 24. The interlaced walls 24 define internally thereof, two groups of parallel passages including respectively inlet passages 26 and outlet passages 28, each extending to opposite ends of the substrate 20. The inlet passages 26 are open at the inlet end 30 of the substrate 20 and are closed at the outlet end 32 of the substrate, while the outlet passages 28 are closed at the substrate inlet end 30 and open at the outlet end 32.

Figure 2:
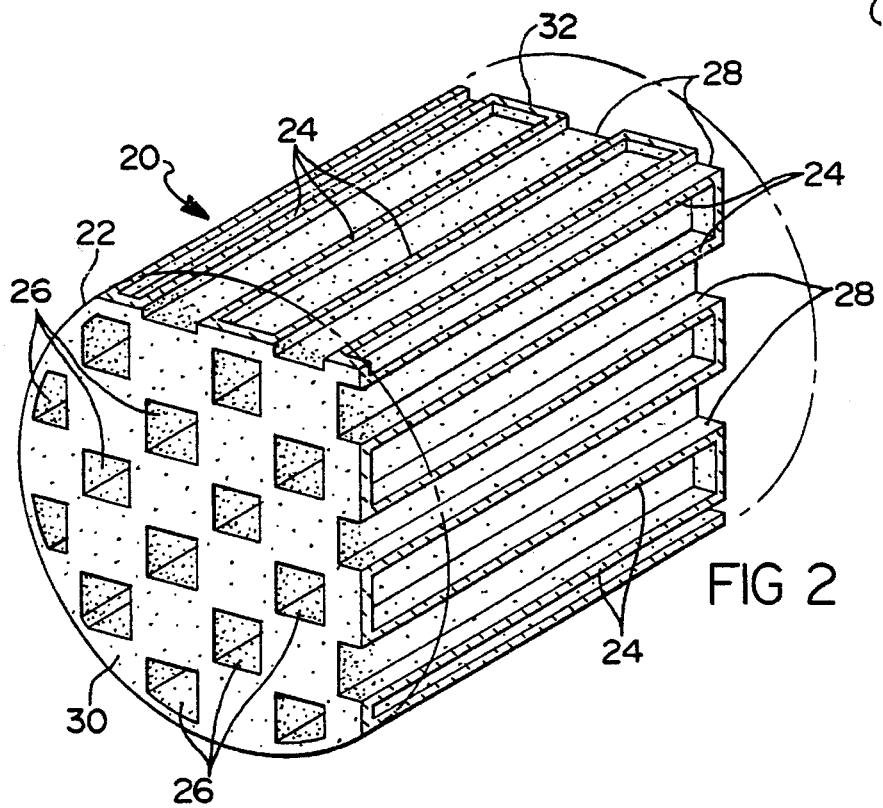
FIG. 2 is a sectional pictorial view showing the construction of the wall flow ceramic filter substrate employed in the adsorber of the present invention.
Figure 3:
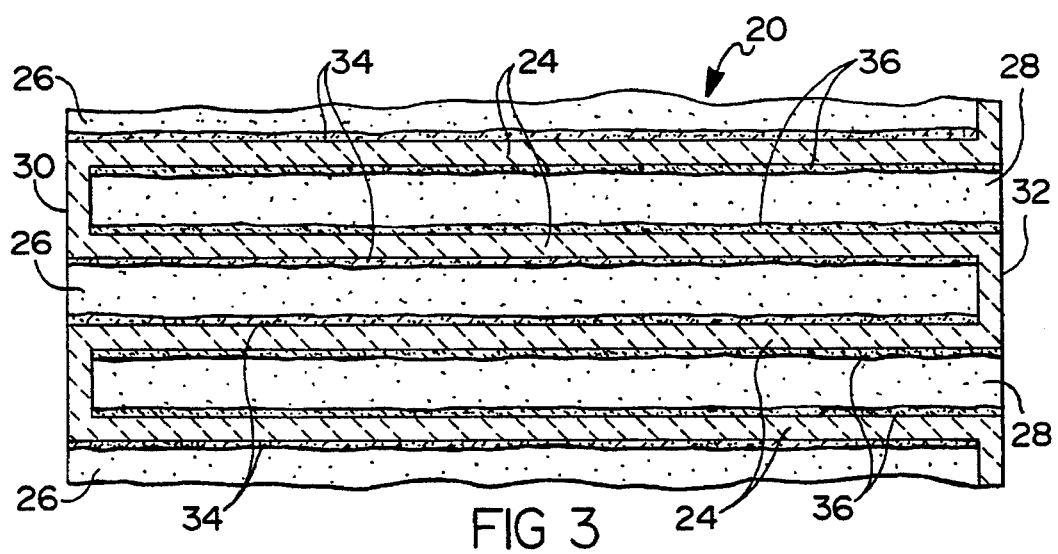
FIG. 3 is a sectional pictorial view of a portion of the adsorber of FIG. 2.

Shown in FIG. 2, the passages 26,28 may be of a square cross section although numerous other configurations are contemplated. Further, the inlet and outlet passages 26,28 are arranged in vertical and horizontal rows (as viewed in cross section) with the inlet passages 26 alternating with exhaust passages 28 in a checkerboard pattern, see FIG. 2. Thus it will be appreciated that each interior wall portion 24 of the substrate lies between an inlet passage 26 and an outlet passage 28 at every point of its surface except where it engages another wall, as it does at the corners of the passages. Consequently, with the exception of the corner engagements, the inlet passages 26 are spaced from one another by intervening outlet passages 28 and vice versa.

The construction of the ceramic substrate 20 is such that the interior walls 24 are porous so as to permit the passage of exhaust gas therethrough from the inlet to the outlet passages. Applied to the surfaces of the interior walls 24 of the inlet passages 26 is an adsorbent material 34 capable of acting as a molecular-sieve with respect to hydrocarbon molecules in the exhaust gas. A preferred material is a zeolite which is a crystalline aluminosilicate that acts as a high capacity, selective adsorbent because it separates molecules based on the size and configuration of the molecule and, adsorbs molecules in particular those with a permanent dipole moment, with a selectivity not found in other solids.

In an environment as found in the exhaust system of an internal combustion engine, the zeolite is effective in adsorbing hydrocarbon molecules in the exhaust gas stream at low temperatures, such as are experienced following a cold start. As system temperatures increase, the zeolite reaches a temperature at which it begins to desorb the collected hydrocarbons, releasing them into the exhaust gas stream. The zeolite is coated on the interior surfaces of the walls 24 of the inlet passages 26 using a suitable washcoat, such as alumina, commonly used to apply catalyst coatings on converters. The size or surface area of the ceramic substrate 20 is calculated based on the expected adsorption capacity of the zeolite and the quantity of cold-start hydrocarbons expected to be emitted from the engine 10.

Applied to the interior surfaces of walls 24 of the outlet passages 28 is a catalyst material 36 formulated to operate at a low temperature relative to the desorption temperature of the zeolite coating 34 in the inlet passages 26. Preferably, a catalyst with a high Palladium (Pd) content is used since it has been found that the light-off temperature of the catalyst can be significantly lowered with an increase in Pd content, on the order of 100–150g/ft$^3$. Catalyst light-off temperature is lowered further if a low temperature washcoat can be used. As with the zeolite coating, the catalyst is deposited on the internal surfaces of the walls 24 of the outlet passages 28 using a suitable washcoat as is well known in the art. The porousness of the wall flow substrate is expected to allow some passage of coatings therethrough during the washcoat process resulting in some mixing of the zeolite and catalyst coatings, however this is not considered to have an adverse effect on the performance of either the zeolite or the catalyst. Additionally, the washcoat will reduce the porousness of the ceramic substrate requiring that the expected backpressure be taken into account when sizing the substrate.

The operation of the exhaust system embodying the present invention will now be described. During the period prior to main converter light-off the bypass valve 38 diverts the exhaust gas exiting primary converter 14 to the adsorber 16 where the gas, containing significant unreacted hydrocarbons, enters the inlet passages 26 of the ceramic wall-flow substrate. The hydrocarbon molecules in the exhaust gas are adsorbed by the zeolite 34 as the exhaust gas passes through the walls 24 of the substrate from the inlet passages 26 to the outlet passages 28, substantially removing the hydrocarbons from the exhaust gas prior to its release to the atmosphere and heating catalyst coating 36 on the walls 24 of outlet passages 28. Exhaust backpressure resulting from the exhaust gas passing through the porous walls 24 acts to increase the residence time of the exhaust gas within the adsorber, relative to the zeolite 34, thereby increasing the efficiency of HC removal from the exhaust gas stream. The placement of the zeolite and catalyst coatings 34,36 on adjacent surfaces of common walls of the wall flow monolith 20 assures that the thermal lag, common to adsorption systems having separate adsorber and catalyst units, between the heating of the zeolite and the catalyst is substantially eliminated. This becomes important as the temperature of the adsorber 16 increases to a level at which the zeolite 34 begins to desorb the collected hydrocarbon molecules. In the present invention, the low temperature catalyst 36 deposited on the walls 24 of the outlet passages 28 of the substrate 20 will preferably achieve its light-off temperature prior to the time the zeolite 34 begins to release the stored hydrocarbon. As release occurs, the hydrocarbon passes through the walls 24 of the substrate 20 with the exhaust gas and is reacted by the catalyst 36 coating the adjacent surfaces of the outlet passages 28. In this stage of operation, the zeolite is substantially regenerated for use during a subsequent cold engine start.

Following light-off of the primary converter 14, diverter valve 38 directs the flow of exhaust into primary exhaust conduit 40, effectively removing the hydrocarbon adsorber 16 from the exhaust system 12 and protecting the high paladium catalyst from the deleterious effects of continuous high temperature operation. It should be recognized that the placement of the primary converter 14 in its location upstream of the adsorber 16 minimizes the thermal load between the primary converter 14 and the engine 10 thereby minimizing the time to light-off the primary converter while reducing the temperatures experienced by the adsorber 16 prior to primary converter operation.

The exhaust system of the present invention provides a solution to undesirable hydrocarbon emissions which are typically released from the exhaust system of an internal combustion engine following an engine cold-start and prior to the light-off and efficient operation of the catalytic converter.

The use of a ceramic wall flow substrate having both a zeolite coating and a catalyst coating assures that the thermal lag between the zeolite and the catalyst, typically seen in adsorber systems,is minimized. Also, backpressure in the wall flow substrate increases the residence time of the exhaust gas relative to the zeolite coating for increased adsorption of hydrocarbons.

A catalyst formulated for low temperature light-off assures that the catalyst will operate when the zeolite reaches an elevated temperature at which it desorbs the stored hydrocarbons so as to minimize hydrocarbon release. A valved bypass directs exhaust flow around the adsorber during normal, high temperature operation to avoid damaging effects of high operating temperatures on the low temperature catalyst.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. An exhaust apparatus comprising a ceramic monolith substrate having a plurality of interlaced gas filtering porous internal walls defining a plurality of parallel passages extending to opposite ends of the substrate, said passages including a first group comprising inlet passages open at one end of the substrate and closed at the other end, and a second group comprising outlet passages closed at said one end of said substrate and open at the other end, wherein said inlet and outlet passages are arranged such that each of said porous internal walls of said substrate lies between an inlet passage and an outlet passage for gas flow therebetween, said inlet passages having interior surfaces with an adsorbent material disposed thereon to adsorb hydrocarbon molecules from exhaust gas passing therethrough below a temperature and to desorb said hydrocarbon molecules above said temperature, said outlet passages having interior surfaces with a catalyst material disposed thereon to convert hydrocarbon molecules desorbed from said adsorbent material and passing through said porous internal walls from said inlet passages to said outlet passages.

2. An exhaust apparatus, as defined in claim 1, said adsorbent material comprising a zeolite.

3. An exhaust apparatus, as defined in claim 1, said catalyst material having a light-off temperature below said temperature at which said adsorbent material desorbs hydrocarbon molecules.

4. An exhaust system for use on an internal combustion engine comprising a primary catalytic converter downstream of the engine, a hydrocarbon adsorber downstream of said primary converter, a bypass for conducting exhaust gas exiting said primary converter around said hydrocarbon adsorber and a bypass valve disposed between said primary converter and said hydrocarbon adsorber to regulate exhaust flow to said adsorber following engine cold start and to said bypass during high-temperature operation, said hydrocarbon adsorber comprising a ceramic monolith substrate having a plurality of thin interlaced gas filtering porous internal walls defining a plurality of parallel passages extending to opposite ends of the substrate, said passages including a first group comprising inlet passages open at one end of the substrate and closed at the other end, and a second group comprising outlet passages closed at said one end of said substrate and open at the other end, wherein said inlet and outlet passages are arranged such that each of said porous internal walls of said substrate lies between an inlet passage and an outlet passage for gas flow therebetween, said inlet passages having interior surfaces with an adsorbent material disposed thereon, to adsorb hydrocarbon molecules from exhaust gas passing therethrough below a temperature and to desorb said hydrocarbon molecules above said temperature, said outlet passages having interior surface with a catalyst material disposed thereon to convert hydrocarbon molecules desorbed from said adsorbent material and passing through said porous internal walls from said inlet passages to said outlet passages.

5. An exhaust apparatus, as defined in claim 4, said adsorbent material comprising a zeolite.

6. An exhaust apparatus, as defined in claim 4, said catalyst material having a light-off temperature below said temperature at which said adsorbent material desorbs hydrocarbon molecules.

* * * * *